Figure 1:
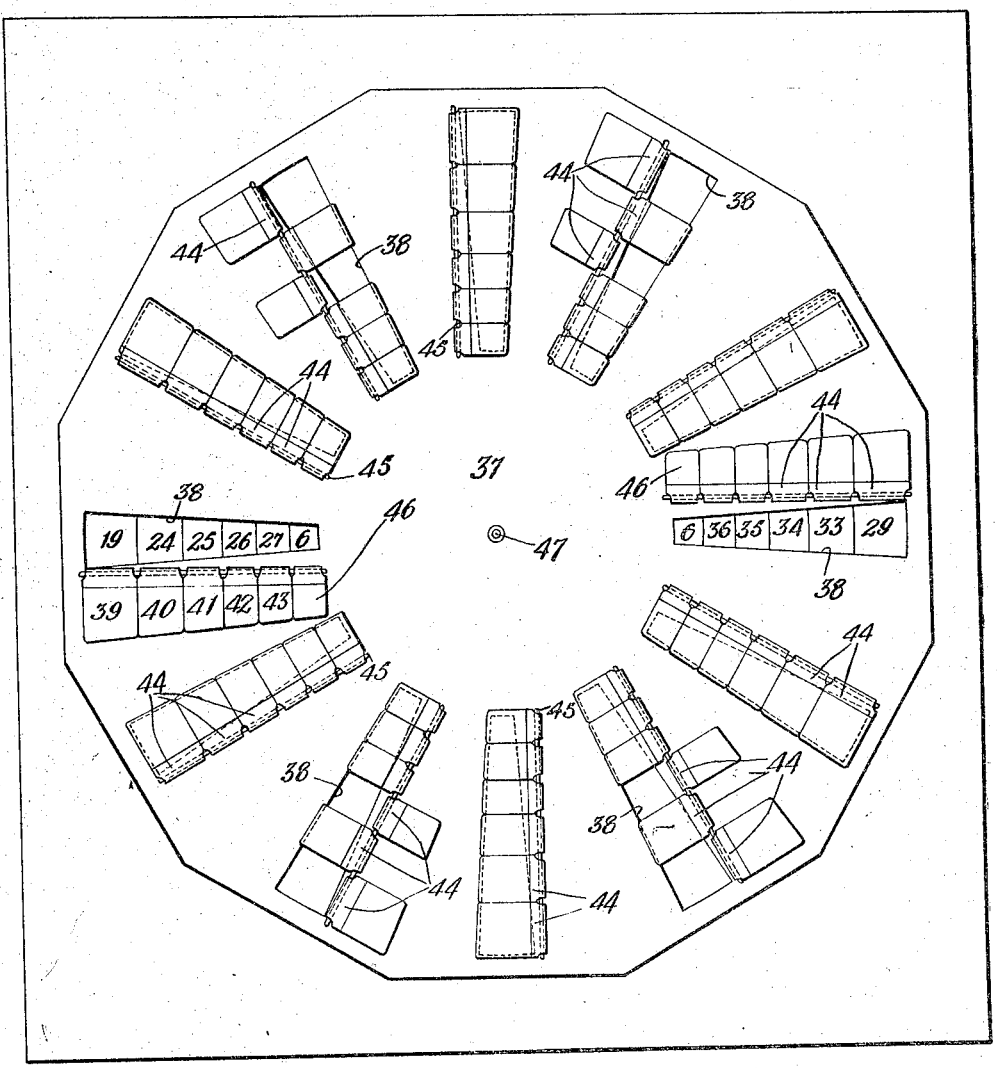

July 20, 1926.

J. WINSCHE 1,593,113

DEVICE FOR DETERMINING HARMONIOUS COLORS

Filed July 24, 1924   2 Sheets—Sheet 1

Inventor
John O. Winsche
By his Attorneys
Sheffield & Betts

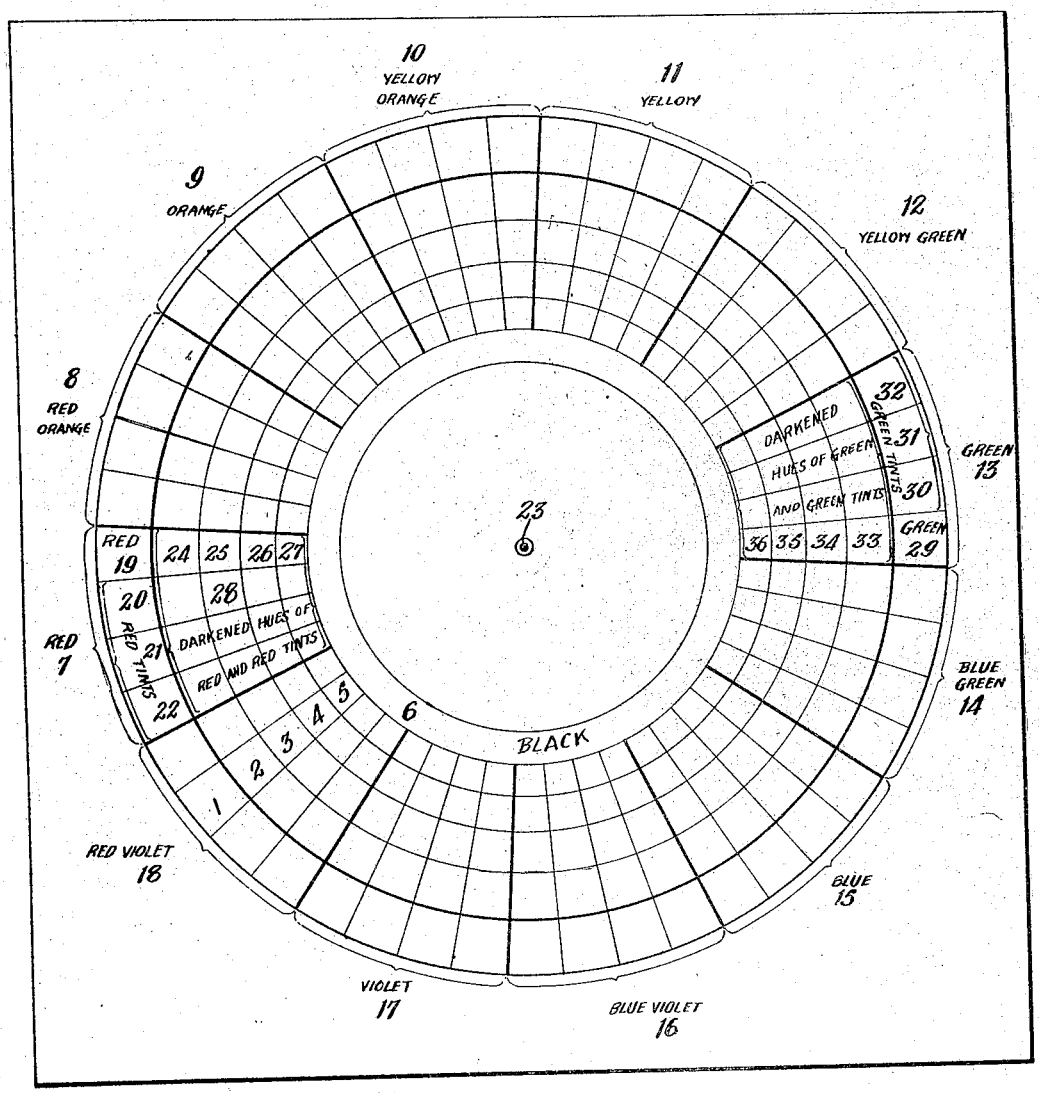

Patented July 20, 1926.

1,593,113

UNITED STATES PATENT OFFICE.

JOHN O. WINSCHE, OF RONKONKOMA, NEW YORK.

DEVICE FOR DETERMINING HARMONIOUS COLORS.

Application filed July 24, 1924. Serial No. 727,919.

This invention relates to a device for determining harmonious colors and more particularly to a color chart and a mask which may be manipulated to exclude certain colors on the chart and to reveal certain other colors.

One of the objects of the invention is to provide a simple efficient device of the kind described which may be operated rapidly to indicate a combination of two or more harmonious colors.

Another object of the invention is to provide such a device in a form which may be cheaply and easily manufactured and which may be readily handled and carried about from place to place. Other objects of the invention will be in part obvious and in part pointed out hereinafter.

The invention accordingly comprises a device for determining harmonious colors which includes a color chart having colors arranged thereon in a predetermined manner and a mask having a plurality of openings through which certain colors on the chart are visible.

The invention may be conveniently described in connection with a color chart in the form of a ring covered by a rotatable mask having radial openings through which the colors may be viewed, and in the preferred embodiment shown in the drawings such a device appears although it will be understood that the invention is not restricted to such a circular color chart with a mask having such openings but may assume other forms where the chart and mask openings are rectilinear for example.

In the drawings referred to, forming part of the specification, Fig. 1 represents a plan view of the device showing certain flaps covering openings of the mask closed and certain other flaps opened to reveal two series of triad combinations of color. In addition, one series of flaps is left entirely open to show the structure beneath. Fig. 2 represents a plan view of the color chart itself with a mask removed.

Referring now to these drawings, particularly to Fig. 2, the color chart is shown in the form of suitably mounted concentric color bands or rings designated by the numerals 1, 2, 3, 4, 5, and 6. Rings 1, 2, 3, 4, and 5 are divided into twelve equal segments as here shown by radial lines. I have numbered these segments and designated them as follows: segment 7 red, 8 red orange, 9 orange, 10 yellow orange, 11 yellow, 12 yellow green, 13 green, 14 blue green, 15 blue, 16 blue violet, 17 violet, 18 red violet. Ring 1 includes full colors and their tints while rings 2, 3, 4 and 5 represent darkened hues of color and color tints. For example, referring to segment 7 showing red, its tints and hues, I have designated that portion of the circle 1 represented by the numeral 19 and which is approximately in the form of a "square" as red and those "squares" numbered 20, 21, and 22 of that same circle I have designated as red tints. I have called these segments "squares" for convenience although, of course, strictly speaking, their shape is slight different from the square. The red tints designated by squares 20, 21 and 22 grow progressively lighter in accordance with their distance from square 19 which shows their full red color. The squares adjacent to square 19 but running towards the common center 23 of the rings, I have designated as squares 24, 25, 26 and 27, and these squares represent respectively progressively darker hues of the color red shown on the square 19. Similarly the series of squares adjacent squares 20, 21 and 22 each shows three squares of progressively darker hues. That is, for example, the red tint shown on square 20 in the series of 3 squares which I have designated as 28 extending from 20 towards the center 23, have progressively darker hues, the one next to square 20 being a little darker than 20, the second of the squares being still darker, and the third of the squares being still darker and the fourth being darkest. The same is true of the series extending from squares 21 and 22. This darkening is accomplished by mixing certain quantities of green with the various reds. This method of obtaining the hues will be understood by referring to segment 13 of the chart wherein I have designated square 29 as green, squares 30, 31 and 32 as green tints. It will be understood that these green tints progress in a similar manner to the progression of the red tints. In this green segment I have also designated squares 33, 34, 35 and 36 as the progressively darkening hues of green and it will be understood that progressively darkening hues of the green tints are similarly arranged with respect to the squares 30, 31 and 32 as the darkening hues of the red tints were arranged as previously described.

Now, in order to form the darkening hues of red shown in the square 24, predetermined quantities of the green and red pigments employed to produce red square 19 and green square 29, would be mixed, the red being predominant in quantity, and this resulting pigment would be employed to produce square 24. Square 25 would be produced by adding a somewhat larger amount of green than employed to produce square 24, but red would still be predominant. Similarly squares 26 and 27 are made with increasing quantities of green corresponding to the darkening hues of the red tints shown in the series 2.

From the above description it will thus appear that the sectors of the complementary colors red and green are situated diametrically opposite one another and that combinations of these colors and their tints with one another produce the darkening hues described. Similarly it will be seen that segment 8 red orange is diametrically opposite its complementary segment 14 which is blue green. Segment 9 orange is diametrically opposite its complementary segment 15 blue. Segment 10 yellow orange is diametrically opposite its complementary segment 16 blue violet. Segment 11 yellow is diametrically opposite its complementary segment 17 violet. Segment 12 yellow green is diametrically opposite its complementary segment 18 red violet. It will also be understood that the darkening hues of these segments may be made by mixing their complementary colors with them in a manner already described with respect to the segments red and green. It is also pointed out that although twelve color segments are shown to produce a certain spectrum, the invention is not limited to the use of such spectrum but may employ a greater or less number of colors arranged in a predetermined manner on the chart.

It will be observed that I have described red and green as complementary colors and, in general, those colors which occupy diametrically opposite positions on the color chart as complementary. In so doing, I have adopted one color theory, but it will be understood that I do not intend to restrict myself to such theory as I may arrange colors as complementary in accordance with other recognized theories. For example, I may place diametrically opposite one another crimson and green to represent complementary colors, or I may place diametrically opposite one another cyan blue and red to represent complementary colors.

The ring 6 is black throughout and is provided for convenience in order that the effect of black with various combinations may be observed, although since black is not a color of the spectrum, it is relatively unimportant in determining color harmonies.

Referring now to Fig. 1 the mask 37 is shown provided with a series of twelve equidistantly spaced radially directed openings 38. The sides of these openings coincide with the radii of the concentric rings 1, 2, 3, 4, 5 and 6. These openings are shaped so that each will display only one color and its darkening hues at a time; for example, the radial opening shown in full lines on the left of Fig. 1 displays only the red square 19 and the darkening hues of red, 24, 25, 26 and 27 and also shows a portion of the black ring 6. Normally, however, these openings are partially or entirely closed by a series of five shutters, shown as flaps, each flap serving to shut off a particular square lying therebeneath; for example, flaps 39, 40, 41, 42 and 43 all shown open, are adapted, when swung downwardly, to cover respectively squares 19, 24, 25, 26 and 27. Similarly the series of flaps covering the eleven other radial openings may be swung up or down to reveal corresponding color squares appearing therebeneath. The flaps operate independently of one another so that one or more squares of a series of colors may be exposed as desired. The radial openings 38, as they are in Fig. 1, are adapted to expose, upon opening of the proper flaps, the series of full tones of red, red orange, orange, yellow orange, yellow, etc., and their corresponding darkening hues. The flaps are preferably made of aluminum or similar light material, and as shown in this embodiment each is provided with a channel formed by the folding of one end 44 of the flap back on itself. The channels are aligned and a common pintle 45, about which the flaps revolve, passes therethrough.

Flaps 46 of similar construction to the flaps previously described, and mounted on the pintles 45 are adapted to expose a square of the black ring 6. Instead of flaps slides may be substituted.

The mask 37 is provided with an aperture at its center through which passes a pin 47 projecting upwardly from the color chart beneath. About this pin, as an axis, the mask 37 is adapted to rotate. The rotation is preferably performed manually and for this purpose the mask is here shown as an equilateral twelve-sided figure. Both the chart and mask are preferably flat and of aluminum or similar light portable material, the colors on the color chart being fixed thereto as separate squares. If desired the colors may be stamped, painted, or otherwise arranged on the surface of the chart.

The operation of the device will be readily understood from the above description. In order to secure a color harmony, a color with which other colors are to harmonize is adjusted by rotation of the mask so that it appears through a portion of the opening 38 covered by one of the flaps. Thus flap 39 when open shows the full red square 19. Now by opening the similar flap diametrically opposite, the full green square 29, which is the complementary color of the red square 19, is shown; or if the hue represented by the square 24 is the color with which the harmony is to be made by opening the oppositely positioned corresponding flap complementary green hue of the square 33 appears. Similarly by opening other flaps covering other red hues and then the corresponding diametrically opposite flaps the complementary green hue will appear, and this method of determining the complementary color applies to the various colors on the chart; for instance, if the flap at the outer end of the series next in a clock-wise direction to the red series is opened, tint red orange will appear and diametrically opposite the corresponding flap at the outer end of this opposite series will show tint blue green, the complementary color. If the color harmony is desired in triads starting with red for example as the first series, the corresponding flaps of the third, fifth, seventh, ninth and eleventh series are opened, or if a harmony in fourths is desired starting with red as the first series, corresponding flaps of the fourth, seventh and tenth series are opened. Of course along with any series flaps may be opened to expose black squares in order to determine the effect of black in the various color combinations.

The device is a simple one, efficient in operation and is readily portable. It may be readily operated by one not particularly skilled in determining color harmonies to determine such harmonies with precision. This is particularly true because the device substantially eliminates confusion of the eye by varying colors some of which may or may not be harmonious as arises where for example, a number of dyed samples of material are to be arranged harmoniously as to color. If one of the dyed samples is slightly off color so that it does not give a precise harmony the eye may be confused by the presence of the other colors so that apparently a precise harmony exists. With the present device, however, once a color has been fixed on the chart as the one with which the harmony is to be made, the color selected on the chart being matched with a dyed sample, then by opening the appropriate flaps to secure a color harmony other dyed samples may be compared one at a time with its corresponding color shown on the chart to determine precisely whether it is harmonious.

It will be understood that the description given above of the device shown in the drawings is illustrative and is not to be construed in a limiting sense as many other apparently widely different embodiments of the invention may be made without departing from the spirit thereof.

Having thus described my invention, what I claim and desire to protect by Letters Patent, is:

1. A device for determining harmonious colors which comprises a color chart having colors arranged thereon in a predetermined manner a mask having a plurality of openings through which colors on the chart are visible, and closures on said mask to hide and reveal at will the colors on the color chart as desired.

2. A device for determining harmonious colors which comprises a color chart having colors arranged thereon in a predetermined manner and a mask having a plurality of openings through which certain colors on the chart are visible, and a corresponding number of closures for said openings, the chart and mask being movable with respect to one another to display upon opening said closures a succession of sets of colors through said openings.

3. A device for determining harmonious colors which comprises a color chart having a series of color rings and a mask having a plurality of openings adapted to be brought successively over certain sets of colors on the chart, and shutters on said mask to hide and reveal the color rings beneath as desired.

4. A device for determining harmonious colors which comprises a color chart having colors of a spectrum arranged thereon in substantially concentric rings and a movable mask concentric with the chart having a series of radially disposed openings through which certain colors on the chart are visible, and shutters on said mask to hide and reveal the colors on the color chart as desired.

5. A device for determining harmonious colors which comprises a color chart having concentric color rings thereon, the rings being divided into a series of segments each segment containing squares including the full color and variations thereof and a mask concentric with the chart and mounted to rotate thereon, said mask having a series of radially disposed openings each of said openings being adapted to register with a series of radially disposed squares of each segment and means to close said openings as desired.

6. A device for determining harmonious colors which comprises a color chart having a series of concentric adjacent color rings divided into a series of radial segments, each of the segments being divided into radial series of colors, the segments progressing circumferentially from the full color through varying tints and each radial series having a succession of hues darkening towards the common center at the concentric rings, a movable mask having openings adapted to register in succession with each of said radial series and shutters for eliminating from view one or more of the colors of each radial series.

7. A device for determining harmonious colors which comprises a color chart having a series of concentric adjacent color rings divided into a series of radial segments arranged so that complementary colors of a spectrum occupy diametrically opposite positions on the chart, each of the segments being divided into radial series of colors, the segments progressing circumferentially from the full color through varying tints and each radial series having a succession of hues darkening towards the center, a movable rotatable flat mask having openings adapted to register in succession with each of said radial series and shutters for eliminating from view one or more of the colors of each radial flap.

8. As a new article of manufacture, a substantially circular color chart formed of concentric rings constituting a spectrum, the outermost of said rings representing full colors and tints thereof arranged in segments of equal arc, the inner rings containing hues progressively darkening towards the center and said inner rings being divided into segments corresponding to the segments of the outer ring, each of the segments being further subdivided by substantially radial lines forming a series of smaller segments, each smaller segment containing a full color or tint thereof at one end and hues progressively darkened towards the other end by admixture of the complementary color.

JOHN O. WINSCHE.